(12) United States Patent
Lacomis

(10) Patent No.: US 6,905,019 B2
(45) Date of Patent: Jun. 14, 2005

(54) MAGAZINE INSERT WITH RECORDING MEDIUM COMPARTMENT

(75) Inventor: James Jon Lacomis, Avoca, PA (US)

(73) Assignee: Wea Manufacturing Inc., Olyphant, PA (US)

( * ) Notice: Subject to any disclaimer, the term of this patent is extended or adjusted under 35 U.S.C. 154(b) by 109 days.

(21) Appl. No.: 10/268,306

(22) Filed: Oct. 9, 2002

(65) Prior Publication Data

US 2004/0069660 A1 Apr. 15, 2004

(51) Int. Cl.$^7$ .............................................. B65D 85/57
(52) U.S. Cl. ...................... 206/312; 206/308.1; 283/56; 283/116
(58) Field of Search .............................. 206/232, 308.1, 206/312, 472; 229/68.1, 71; 283/56, 116

(56) References Cited

U.S. PATENT DOCUMENTS

| | | |
|---|---|---|
| 893,202 A | 7/1908 | Shaw |
| 2,178,084 A | 10/1939 | Sawdon |
| 4,095,695 A | 6/1978 | Steidinger |
| 5,419,587 A | 5/1995 | McClure et al. |
| 5,590,912 A | 1/1997 | Stevens |
| 5,638,953 A | 6/1997 | House |
| 5,662,217 A * | 9/1997 | Durr ....................... 206/308.1 |
| 5,694,743 A | 12/1997 | Beighle |
| 5,697,496 A * | 12/1997 | Bauer ...................... 206/308.1 |
| 5,713,605 A | 2/1998 | Pace et al. |
| 5,772,019 A | 6/1998 | Reed |
| 5,782,349 A | 7/1998 | Combs |
| 5,857,565 A | 1/1999 | Baker et al. |
| 5,881,538 A | 3/1999 | Blohm |
| 5,950,401 A | 9/1999 | Blohm et al. |
| 6,016,907 A | 1/2000 | Dreier |
| 6,059,316 A | 5/2000 | Whittington |
| 6,068,117 A | 5/2000 | Koehn |
| 6,126,201 A | 10/2000 | Pace et al. |

* cited by examiner

Primary Examiner—David T. Fidei
(74) Attorney, Agent, or Firm—Amster, Rothstein & Ebenstein

(57) ABSTRACT

An insert for a magazine or book has a recording medium compartment defining a top edge, a bottom edge and two lateral side edges. Two of the edges are closed at all times, one of the edges is initially open for passage therethrough of a recording medium into the compartment (and then closed), and another of the edges is initially closed but openable for passage therethrough of the recording medium out of the compartment.

7 Claims, 4 Drawing Sheets

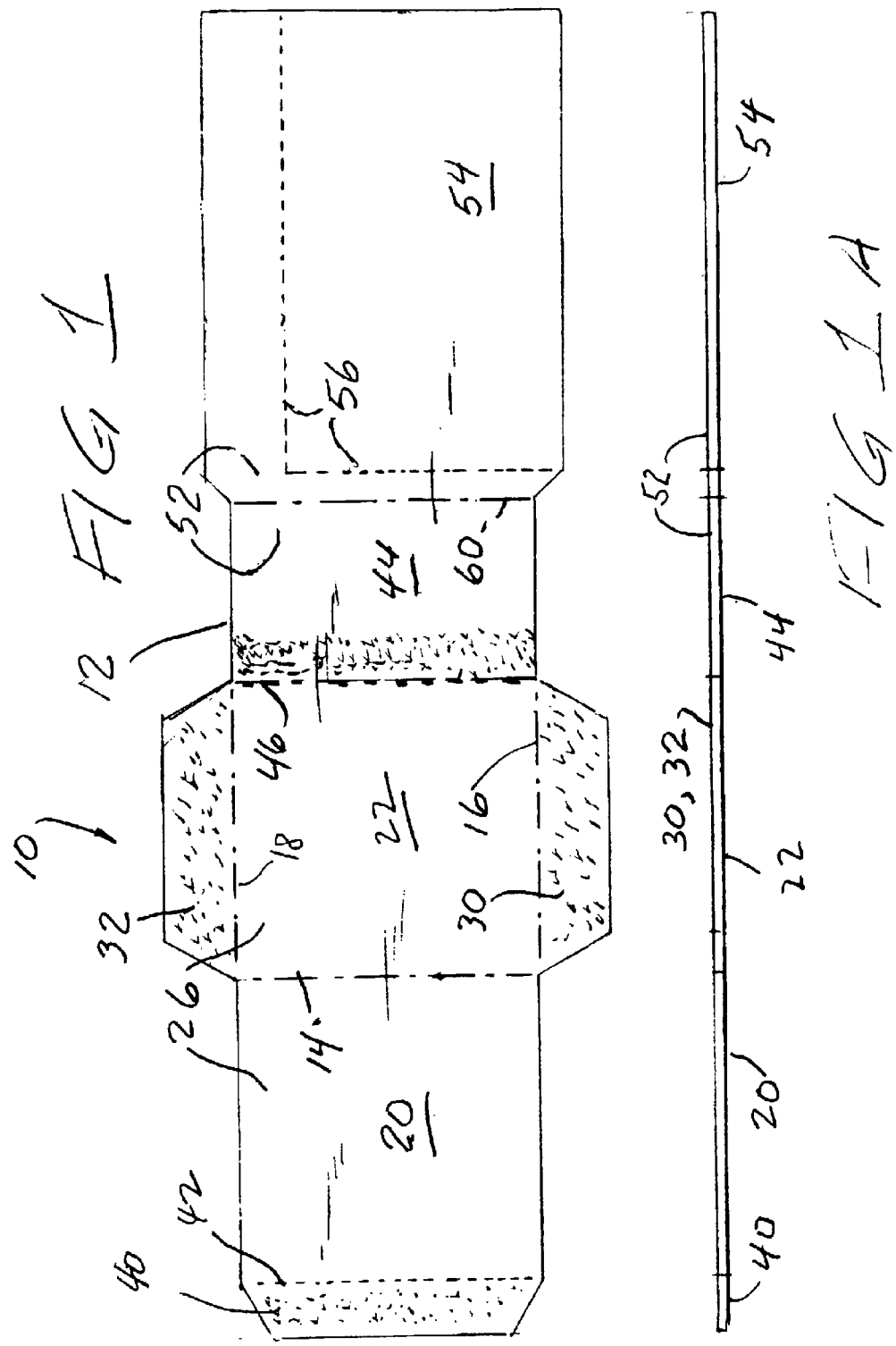

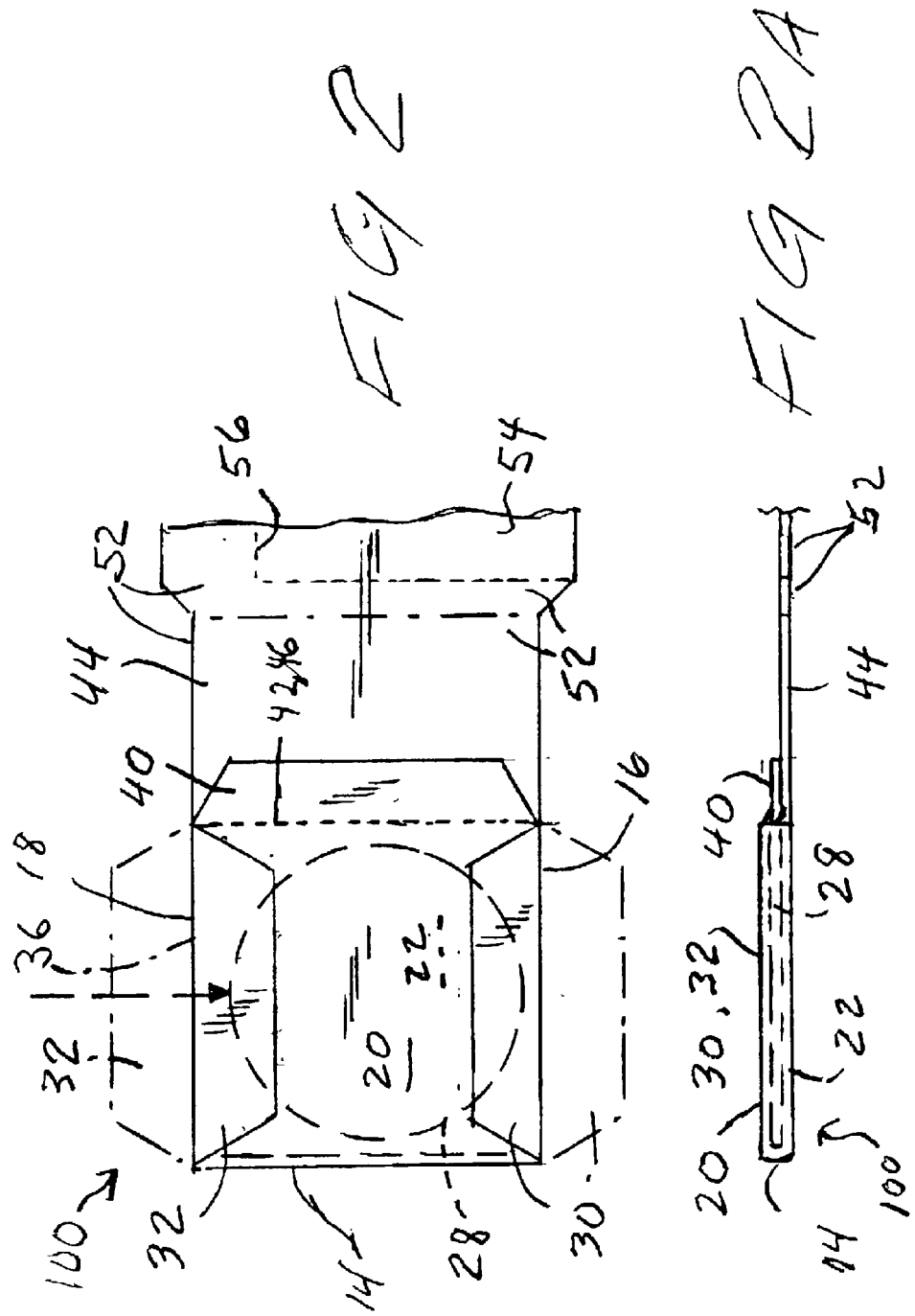

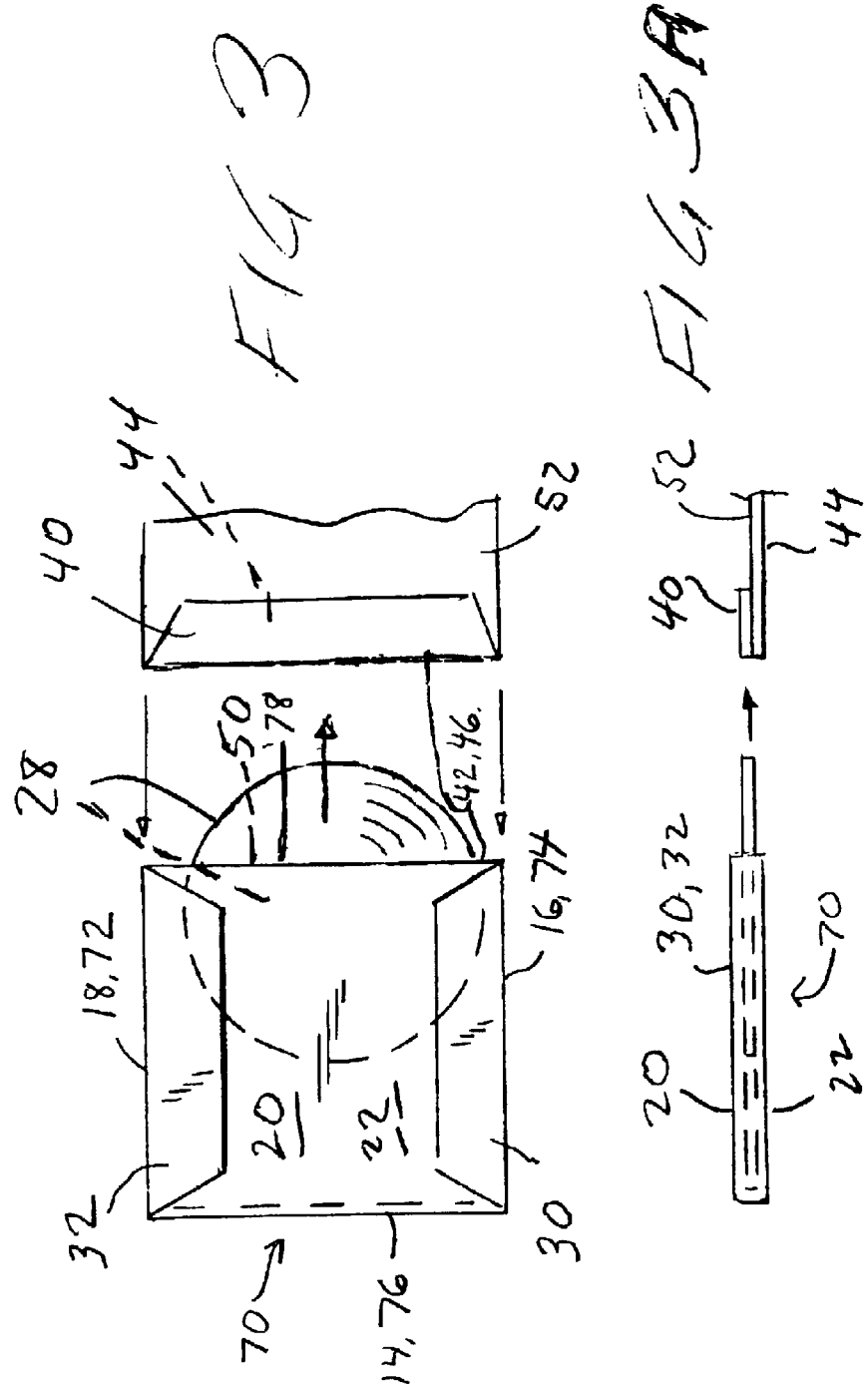

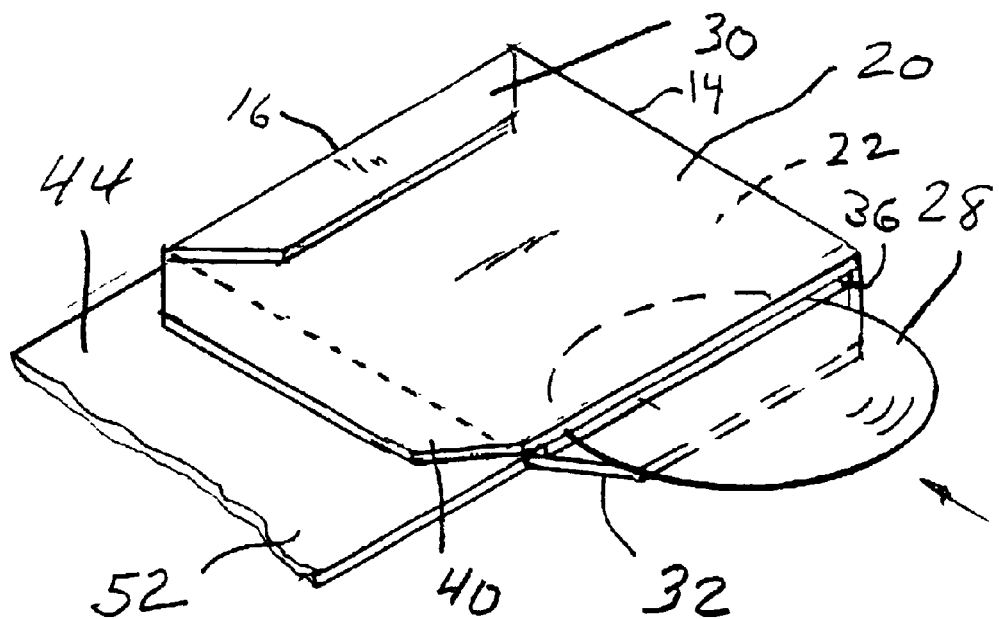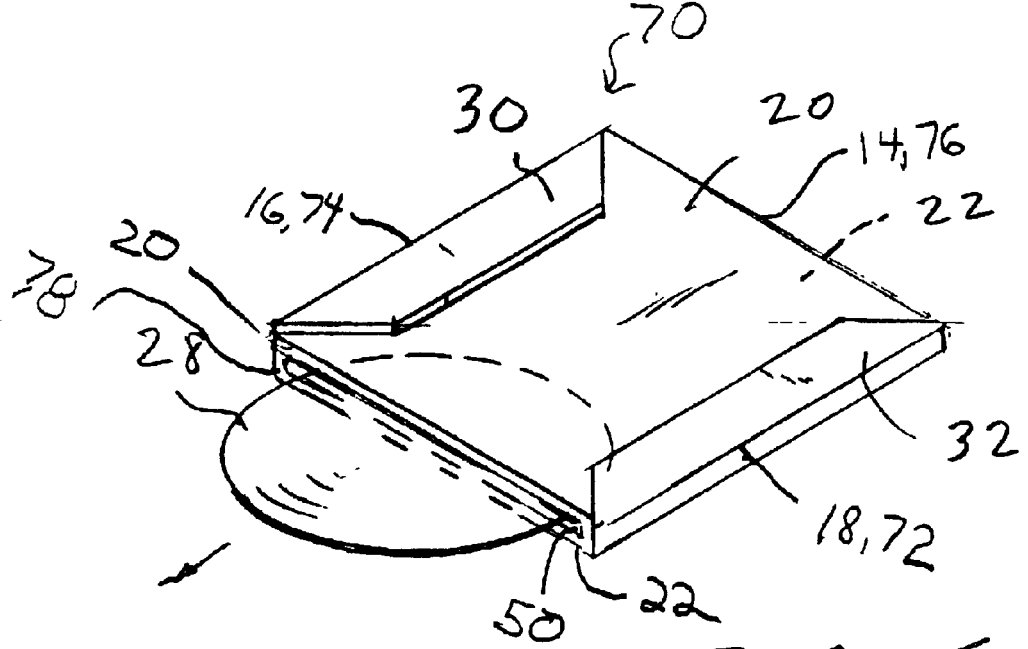

MAGAZINE INSERT WITH RECORDING MEDIUM COMPARTMENT

BACKGROUND OF THE INVENTION

The present invention relates to an insert having a compartment for a recording medium, and more particularly to such a one-piece insert for saddle stitching into a book or magazine.

It is well-known to provide a one-piece insert for binding into a book or magazine, preferably by saddle-stitching (i.e., stapling). Perforated lines of the insert may define a mailer (e.g., a reply card) and a compartment for a recording medium (e.g., a compact disc, CD-ROM, or the like, whether square or rectangular, whether perforated or not). Typically both the mailer and the compartment are detachable from the magazine or book, while leaving the rest of the insert secured therein. After its removal from the magazine or book, the recording medium compartment is preferably useful for storage of the recording medium. The present invention is particularly well adapted for use with a recording medium in the form of an 80 millimeter disc or like mini-disc smaller than the conventional CD or CD-ROM. Each insert is preferably formed from a single sheet of paperboard which is coated on both sides so that it may be easily printed on both sides and so that the recording medium within the compartment encounters only the soft coated surface of the paperboard.

Typically, after the compartment has been removed from the magazine or book, it must still be manually opened in order to enable removal of the recording medium therefrom. This is necessary so that the recording medium is totally enclosed within the compartment and therefore totally protected after insertion, both during subsequent manufacturing operations and during its life in the magazine or book as part of the insert.

The commercially available recording medium compartments fall generally into two categories. In one category are the recording medium compartments which are actually formed (constructed) about the recording medium so that the recording medium is never "inserted" into the compartment. Such compartments have not be found to be entirely satisfactory. First, the recording medium must be present at the place where the compartment is formed, thereby reducing the flexibility associated with compartments which are first formed, and then at a later date have the recording medium inserted thereinto. Second, the recording medium is exposed to the ambient atmosphere in the compartment manufacturing plant, which atmosphere may be contaminated with particulate matter or volatile solvents or otherwise unsuitable for a delicate recording medium. Third, precisely because the compartment is formed about the recording medium, the compartment-forming operation is necessarily conducted under constraints which slow the compartment-forming process, and therefore reduces its economic viability.

In the other category, the compartment is pre-formed with an open flap on one edge thereof (whether it be a top edge, bottom edge or lateral edge), the recording medium is inserted thereinto through the open edge, and then the open flap is automatically sealed so that the recording medium is totally enclosed within the compartment and therefore totally protected during subsequent manufacturing operations and during its life in the magazine or book. The flap is eventually opened or cut in order to permit removal of the recording medium from the compartment. This flap opening operation must be performed by the ultimate user of the recording medium in an operation separate and distinct from the removal of the compartment from the remainder of the insert (i.e., from the removal of the compartment from the magazine or book).

Regardless of the category in question, the insert including the recording medium compartment (and the recording medium therein) is then bound into the magazine or book by conventional automatic equipment—for example, using saddle stitching.

Accordingly, it is an object of the present invention to provide an insert which in one preferred embodiment is suitable for saddle-stitching into a magazine or book.

Another object is to provide such an insert containing a recording medium compartment which in one preferred embodiment is opened automatically (to permit removal of the recording medium) when the ultimate user removes the recording medium compartment from the remainder of the insert—that is, from the magazine or book.

A further object is to provide a storage compartment wherein in one preferred embodiment the recording medium is inserted into the compartment through one edge during the manufacturing process and subsequently removed from the compartment by the ultimate user through a different edge.

It is also an object of the present invention to provide such an insert and compartment which in a preferred embodiment is well-adapted for use with commercially available automatic feeders for insertion of a recording medium into the compartment and with automatic binding equipment for binding of the insert into a magazine or book.

It is also an object of the present invention to provide such an insert and compartment which are inexpensive and easy to manufacture and use.

SUMMARY OF THE INVENTION

It has now been found that the above and related objects of the present invention are obtained in an insert having a recording medium compartment. The insert is formed by a single sheet of paperboard and comprises a side fold forming a front and back of a compartment for a recording medium, a bottom fold defining a bottom flap secured to the compartment front adjacent the bottom thereof, and a top fold defining a top flap securable to the compartment front adjacent the top thereof. The top of the compartment front and the top of the compartment back define a passageway therebetween into the compartment for a recording medium. A front extension is secured by a first line of weakness to a lateral side of the compartment front opposite the side fold, and a back extension is secured by a second line of weakness to a lateral side of the compartment back opposite the side fold. The first and second lines of weakness overlie one another, and the front extension is secured to the back extension. When the top flap is secured to the compartment front, removal of the front and back extensions along the first and second lines of weakness leaves the compartment defining a passageway for a recording medium out of the compartment between the lateral sides of the compartment front and back opposite the side fold.

Both major surfaces of the sheet are preferably coated.

In a preferred embodiment, the back extension extends beyond the front extension opposite the side fold to define a segment available for binding into a bound object (e.g., a magazine or book). The compartment is removable from the bound object while leaving the binding segment and the front and back extensions with the bound object. The compartment contains a recording medium, and the top flap is non-releasably secured to the compartment front adjacent the top thereof.

The present invention additionally comprises a compartment having a front and a back. The front and back cooperatively define a top edge, a bottom edge, and two horizontally spaced lateral side edges connecting the top and bottom edges. Two of the edges are closed at all times. One of the edges is initially open for passage therethrough of a recording medium into the compartment, and another one of the edges is initially closed but openable for passage therethrough of the recording medium out of the compartment.

Preferably the one edge is one of the top and bottom edges, and the another edge is one of the lateral side edges.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 1 is a top plan view of a blank from which the insert of the present invention may be formed;

FIG. 1A is a side elevational view thereof;

FIG. 2 is a fragmentary top plan view of the intermediate product made from the blank, including a recording medium within the compartment;

FIG. 2A is a side elevational view thereof;

FIG. 3 is a fragmentary top plan view of the compartment after removal thereof from the remainder of the insert;

FIG. 3A is a side elevational view thereof;

FIG. 4 is a fragmentary isometric view of the intermediate product during insertion of a recording medium into the compartment; and FIG. 5 is an isometric view of the separated compartment during removal of the recording medium therefrom.

DETAILED DESCRIPTION OF THE PREFERRED EMBODIMENTS

Referring now to the drawing, and in particular to FIGS. 1 and 1A thereof, therein illustrated is a blank according to the present invention, generally designated by the reference numeral 10. The blank 10 is formed of a single sheet 12 of paperboard or the like for use in forming an insert according to the present invention, generally designated 100 and illustrated in FIGS. 2 and 2A. The single sheet 12 is preferably coated on both surfaces thereof, e.g., for softness and for printing.

The blank 10 comprises a side fold 14, a bottom fold 16 and a top fold 18. The side fold 14 eventually forms a front 20 and back 22 of a compartment 26 for a recording medium 28. The bottom fold 16 defines a bottom flap 30 extending downwardly from the compartment back 22, and the top fold 18 defines a top flap 32 extending upwardly from the compartment back 22.

In an intermediate product illustrated in FIGS. 2 and 2A, the bottom flap 30 is folded upwardly and glued or otherwise secured to the compartment front 20 adjacent the bottom thereof. As illustrated in phantom line in FIG. 2, the top flap 32 is gluable or otherwise securable to the compartment front 20 adjacent the top thereof. In the final product 100 illustrated in solid line in FIG. 2 (which final product includes the recording medium 28 within compartment 26), the top flap 32 is folded downwardly and glued or otherwise secured to the compartment front 20 adjacent the top thereof. In the intermediate product, the top of the compartment front 20 and the top of the compartment back 22 cooperatively define a passageway 36 therebetween (adjacent top fold 18) into the compartment 26 for insertion of the recording medium 28.

Still referring now to FIGS. 2 and 2A, in the intermediate product a front extension 40 is secured by a first line of weakness 42 to a lateral side of the compartment front 20 opposite the side fold 14, while a back extension 44 is secured by a second line of weakness 46 to a lateral side of the compartment back 22 opposite side fold 14. The first and second lines of weakness 42, 46 overlie one another, with the front extension 40 being glued or otherwise secured to the back extension 44 (although not necessarily covering the entirety thereof). The first and second lines of weakness 42, 46 may additionally constitute foldlines, but are primarily lines of weakness (e.g., perforated lines) to facilitate tearing away of the compartment 26 (formed from front 20, back 22, and flaps 30, 32) from the front and back extensions 40, 44 and the remainder of the insert. The front and back extensions 40, 44 are secured together so as to preclude passage of the recording medium 28 out of the compartment 26 therethrough, but removal of the front and back extensions 40, 44 along the first and second lines of weakness 42, 46 leaves a compartment 26 separated from the remainder of the insert and defining a passageway 50 for the recording medium 28 out of the compartment 26 between the aforementioned torn lateral sides of the compartment front and back 20, 22 opposite the side fold 14.

The back extension 44 extends beyond the front extension 40, opposite the side fold 14, to define a segment 52 available for use in binding the insert 100 into a bound object (not shown)—that is, a magazine or book. The segment 52 may include a mailer or reply card 54 which is severable from the remainder of the segment 52 along lines of weakness 56 (e.g., perforated lines). Similarly, the compartment 26 is removable from the bound object while leaving the front and back extensions 40, 44 and at least a portion of the binding segment 52 with the bound object.

In the blank 10 of FIG. 1, the speckled areas on the bottom flap 30, the top flap 32 and the front and back extensions 40, 42 represent areas where a glue or adhesive (such as a hot melted adhesive) will be applied prior to folding of blank 10 into the final product of FIG. 3. The glue may be applied to the bottom flap 30 and either one or both of the front and back extensions 40, 44 prior to insertion of the recording medium 28 into the compartment 26, but the glue is preferably applied to the top flap 32 only after insertion of the recording medium 28 into the compartment 26 (see FIG. 2), thereby to protect the recording medium from the glue.

Because the compartment 26 is substantially spaced from the binding foldline 60 (in segment 52) about which the saddle stitching operation takes place, the binding operation can be conducted at full speed without fear of damage to recording medium 28 within the compartment 26. The binding operation encounters only a two ply thickness of the paperboard sheet 12 from which the insert 100 is constructed-namely, the material of the sheet 12 on either side of the binding foldline 60. This too facilitates operation of the binding equipment at full speed.

Referring now to FIGS. 3 and 3A in particular, therein illustrated is a compartment according to the present invention, generally designated 70, after separation from the remainder of insert 100. The compartment has a front 20 and a back 22. The front 20 and back 22 cooperatively define a top edge 72, a bottom edge 74 and two horizontally spaced lateral side edges 76, 78 connecting the top and bottom edges 72, 74.

Two of the edges 72–78 are closed at all times after formation of the compartment 70—namely, the bottom edge 74 adjacent foldline 16 and the lateral side edge 76 adjacent foldline 14. Indeed, it will be appreciated that the lateral edge 76 is actually the smooth or folded edge formed by the side fold 14 defining the front 20 and back 22, and the bottom edge 74 is the actually folded edge formed by foldline 16 between the back 22 and the bottom flap 30. The top edge 72 is actually the folded edge formed by foldline 18 between the back 22 and the top flap 32 after the top flap 32 is folded down. As earlier noted, in the intermediate product of FIG. 2, the top edge 72 is initially open (as illustrated in phantom line) for passage therethrough of a recording medium 28 into the compartment 20 during the manufacturing process—that is, before purchase by the retailer. It will also be appreciated that the designations herein of the top and bottom are arbitrary, and that the non-lateral edge closed at all times could be the top edge 72 rather than the bottom edge 74.

Thus, while the lateral side edge 78 is initially closed when it is secured to the rest of the insert 100 by the front and back extensions 40, 44, the side edge 78 is openable to define a passage 50 therethrough (see FIG. 3) for removal of the recording medium 28 from the compartment 70. In the preferred embodiment illustrated, the initially open edge which is subsequently closed during the manufacturing process is one of the top and bottom edges 72, 74 (as illustrated, edge 72) while the edge which is initially closed during the manufacturing process but openable by the consumer is one of the lateral side edges 76, 78 extending at a right angle thereto, and in particular the lateral side edge 78 which is opened automatically upon separation of the compartment 70 from the front and back extensions 40, 44. No additional movement or action on the part of the consumer is required to open the compartment 70 beyond that which is required to remove the compartment 70 from the remainder of the insert 100 which stays with the magazine or book.

FIG. 4 illustrates the recording medium 28 being inserted through passageway 36 of the intermediate product prior to folding down of top flap 32.

FIG. 5 illustrates the recording medium 28 being inserted into the compartment 70 through passageway 50 after separation of the compartment 70 from the remainder of the insert 100.

To summarize, the present invention provides an insert which is suitable for saddle stitching into a magazine or book and contains a recording medium compartment which is opened automatically (to permit removal of the recording medium) when the ultimate user removes the recording medium compartment from the remainder of the insert—that is, from the magazine or book. The present invention also provides a storage compartment wherein the recording medium is inserted into the compartment through one edge during the manufacturing process and subsequently removed from the compartment by the ultimate user through a different edge. The insert and compartment are well-adapted for use with commercially available automatic feeders for insertion of a recording medium into the compartment and with automatic binding equipment for binding of the insert into a magazine or book.

Now that the preferred embodiments of the invention have been shown and described in detail, various modifications and improvements thereon will become readily apparent to those schooled in the art. Accordingly, the spirit and scope of the present invention should be construed broadly and limited only by the appended claims, and not by the forgoing specification.

I claim:

1. An insert having a recording medium compartment, said insert being formed by a single sheet of paperboard and comprising:
   (A) a side fold forming a front and back of a compartment for a recording medium;
   (B) a bottom fold defining a bottom flap secured to said compartment front adjacent the bottom thereof;
   (C) a top fold defining a top flap securable to said compartment front adjacent the top thereof, the top of said compartment front and the top of said compartment back defining an entry passageway therebetween into said compartment for a recording medium;
   (D) a front extension secured by a first line of weakness to a lateral side of said compartment front opposite said side fold; and
   (E) a back extension secured by a second line of weakness to a lateral side of said compartment back opposite said side fold;
   said first and second lines of weakness overlying one another; and
   said front extension being secured to said back extension;
   whereby, when said top flap is secured to said compartment front, removal of said front and back extensions along said first and second lines of weakness leaves said compartment defining an exit passageway for a recording medium out of said compartment between said lateral sides of said compartment front and back opposite said side fold, said entry and exit passageways extending substantially normal to one another.

2. The insert of claim 1 wherein both major surfaces of said sheet are coated.

3. The insert of claim 1 wherein said back extension extends beyond said front extension opposite said side fold to define a segment available for binding into a bound object.

4. The insert of claim 3 wherein said compartment is removable from a bound object while leaving said binding segment and said front and back extensions with the bound object.

5. The insert of claim 1 wherein said compartment contains a recording medium, and said top flap is non-releasably secured to said compartment front adjacent the top thereof.

6. An insert having a recording medium compartment, said insert being formed by a single sheet of paperboard coated on both major surfaces and comprising:
   (A) a side fold forming a front and back of a compartment for a recording medium;
   (B) a bottom fold defining a bottom flap secured to said compartment front adjacent the bottom thereof;
   (C) a top fold defining a top flap securable to said compartment front adjacent the top thereof, the top of said compartment front and the top of said compartment back defining an entry passageway therebetween into said compartment for a recording medium;
   (D) a front extension secured by a first line of weakness to a lateral side of said compartment front opposite said side fold; and
   (E) a back extension secured by a second line of weakness to a lateral side of said compartment back opposite said side fold;

said first and second lines of weakness overlying one another; and said front extension being secured to said back extension;

said back extension extending beyond said front extension opposite said side fold to define a segment available for binding into a bound object; said compartment being removable from the bound object while leaving said binding segment and said front and back extensions with the bound object;

whereby, when said top flap is secured to said compartment front, removal of said front and back extensions along said first and second lines of weakness leaves said compartment defining an exit passageway for a recording medium out of said compartment between said lateral sides of said compartment front and back opposite said side fold, said entry and exit passageways extending substantially normal to one another.

7. The insert of claim 6 wherein said compartment contains a recording medium, and said top flap is non-releasably secured to said compartment front adjacent the top thereof.

* * * * *